Nov. 19, 1940. P. ORR 2,221,897
TRANSMISSION SYNCHRONIZER
Filed Nov. 17, 1939 2 Sheets-Sheet 2
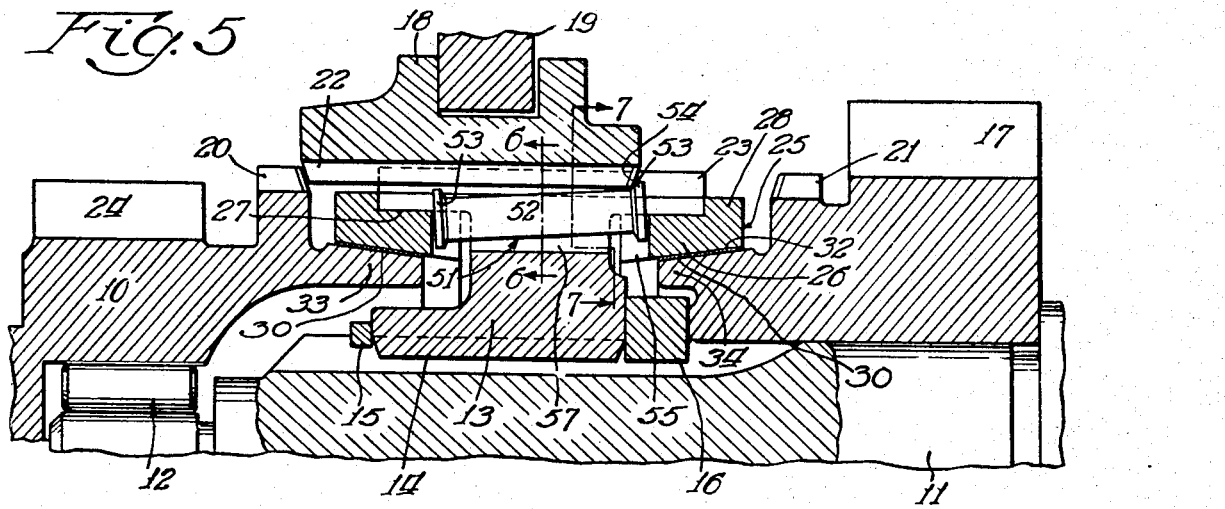
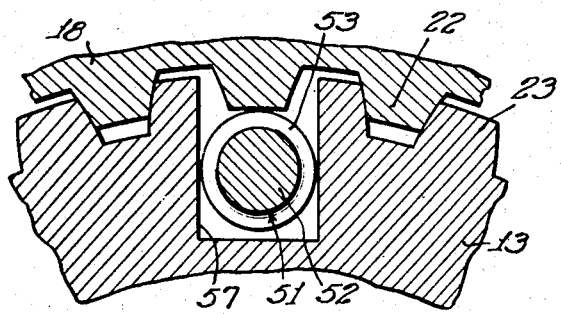
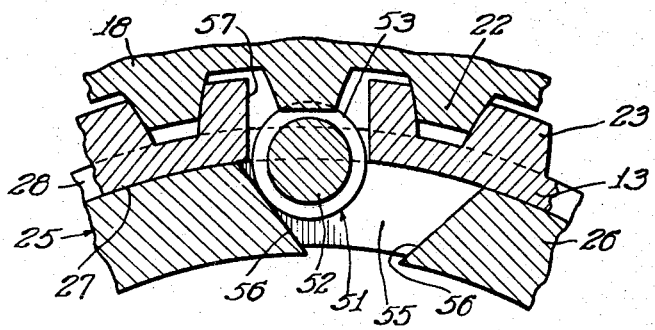
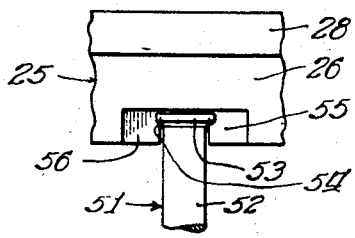
INVENTOR.
Palmer Orr
BY Edward C. Gritzbaugh
ATTORNEY.

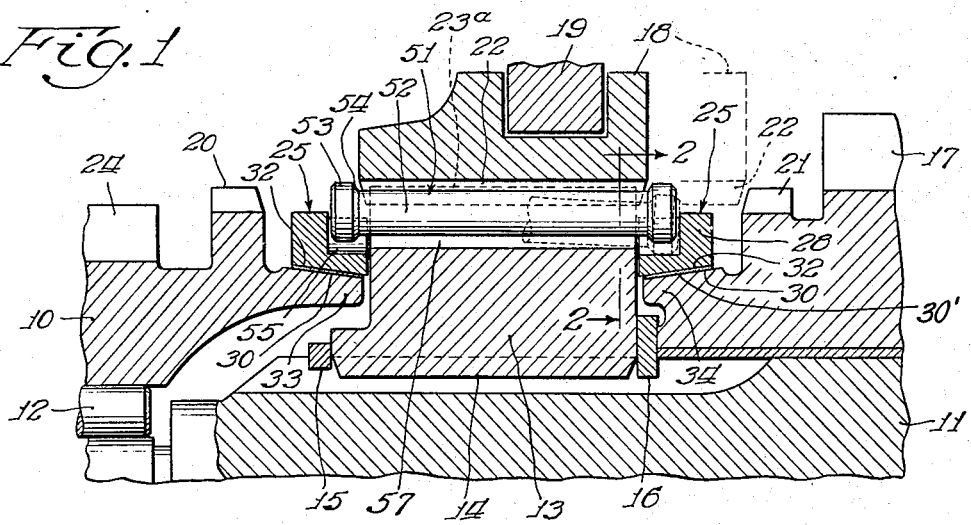
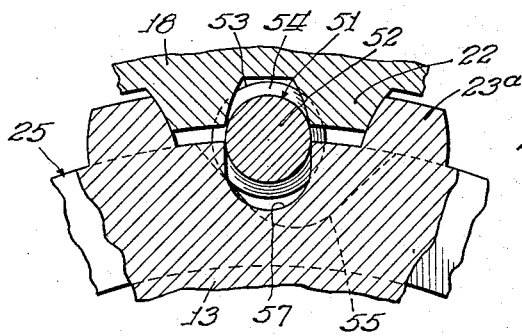
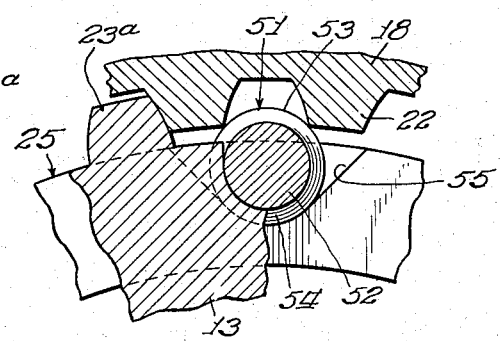
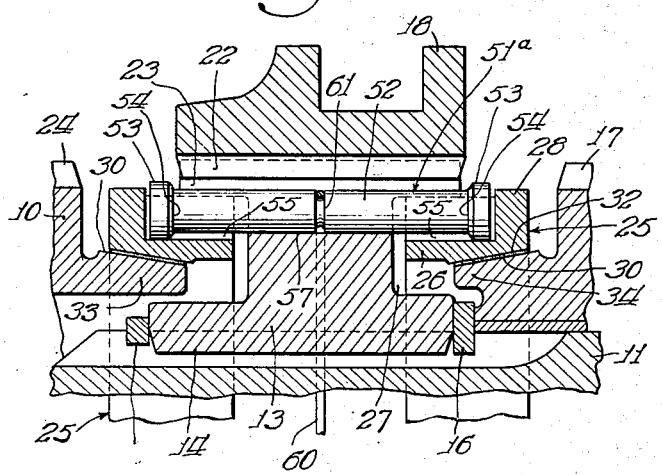
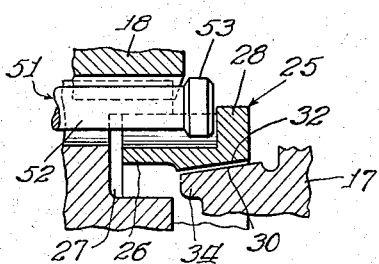

Patented Nov. 19, 1940

2,221,897

UNITED STATES PATENT OFFICE 2,221,897

TRANSMISSION SYNCHRONIZER

Palmer Orr, Muncie, Ind., assignor to Borg-Warner Corporation, Chicago, Ill., a corporation of Illinois Application November 17, 1939, Serial No. 304,891

18 Claims. (Cl. 192—53)

This application is in part a continuation of my application Serial No. 216,861, filed July 1, 1938, for Transmission synchronizer.

The invention relates to synchronizing change-speed gear transmissions of the type employed, for example, in motor vehicles, wherein there is provided means for effecting synchronization of a pair or pairs of torque transmitting members preparatory to connecting said members in positive drive engagement with each other by means of an axially movable positive drive element such as a jaw clutch sleeve or gear.

The invention is particularly directed to synchronizing transmissions of the type wherein the synchronizing means comprises friction clutch elements adapted under axial thrust transmitted to one of such elements from the movable positive drive element, to develop sufficient frictional engagement to cause the torque transmitting members to assume the same speed of rotation, and wherein there is incorporated so-called "blocker" mechanism for preventing the positive drive engagement of the members prior to the time that synchronization is effected.

In a widely used form of synchronizer, the blocking means is incorporated in the movable friction clutch element or synchronizer ring, in the form of lugs or teeth adapted to be biased in blocking relation to the movable positive drive element as a result of limited oscillating movement of the synchronizer ring relative to the member with which it is associated. An object of the present invention is to eliminate the necessity for such blocker lugs or teeth while preserving their function.

The invention deals also with the means for transmitting axial thrust from the movable positive drive element to the synchronizer ring, and has as one of its objects to provide a transmission of this type in which thrust transmitting engagement between the movable positive drive element and the thrust transmitting means will be developed as a result of relative rotation existing between the members to be synchronized, and will be relaxed when synchronization is attained so that the movable drive element may complete its advance to positive driving position.

Other objects of the invention are to provide a transmission synchronizer requiring a minimum of manual effort in the synchronizing operation, having a minimum number of parts, and which is inexpensive and simple to manufacture.

To the attainment of these objects, the invention contemplates a synchronizing transmission wherein a thrust bar functions not only for transmitting thrust, but also as the blocking means.

Other objects, the advantages and uses of the invention will become more apparent after reading the following specification and claims, and after consideration of the drawings forming a part of the specification, wherein:

Fig. 1 is an axial sectional view of a transmission embodying the invention;

Fig. 2 is a transverse sectional view of the same taken as indicated by the line 2—2 of Fig. 1;

Fig. 3 is a transverse sectional view of the same, showing the parts in a different stage of operation;

Fig. 4 is an axial sectional view of a somewhat modified form of the invention;

Fig. 5 is an axial sectional view of another modification of the invention;

Fig. 6 is a transverse sectional view of the same taken as indicated by the line 6—6 of Fig. 5;

Fig. 7 is a transverse sectional view, taken as indicated by the line 7—7 of Fig. 5;

Fig. 8 is a plan view of a portion of a thrust bar and associated portion of a synchronizer ring; and Fig. 9 is a detail sectional view of another modification of the invention.

As an example of one form in which the invention may be embodied, I have shown in the drawings the synchronizing portion of a transmission embodying a torque transmitting member 10, forming the rear end of the drive shaft of the transmission, and torque transmitting members, including the driven shaft 11, piloted as at 12 in the member 10, and the hub member 13, splined as at 14 on the driven shaft 11 and secured against axial movement by retaining rings 15 and 16. Positive drive connection may be established between the torque transmitting members 10 and 11, or between a reduction geared torque transmitting member 17, and the member 11, by an axially movable jaw clutch element 18, adapted to be shifted by a shifting fork 19 into positive clutching engagement with clutch teeth 20 formed on the torque transmitting member 10, or clutch teeth 21 formed on the torque transmitting member 17. To this end, the movable jaw clutch sleeve 18 is formed with internal clutch teeth 22, slidingly splined upon the periphery 23a of the hub member 13, and adapted to engage the clutch teeth 20 or 21 when moved axially.

The torque transmitting member 17 comprises part of a reduction gear train driven from the pinion 24 on the drive shaft 10 through the medium of a conventional countershaft. Upon being moved into clutching engagement with the clutch teeth 20, the sleeve 18 will receive rotation from the drive shaft 10 and transmit it directly through the hub 13 to the driven shaft 11. Upon being moved in the opposite direction, the sleeve 18 will receive rotation from the torque transmitting member 17 through the countershaft just referred to, and will transmit it through the hub member 13 through the driven shaft 11.

In order to synchronize a torque transmitting member 10 or 17 with the hub 13, preparatory to establishing such clutching engagement, I provide a pair of synchronizer rings 25. As shown in Figs. 4 and 5, the hub 13 may have a rim portion 23 defining a pair of axially opening annular recesses 27, and the synchronizer rings 25 may be formed with collar portions 26 extending into the recesses 27, and with radially outwardly projecting flanges 28 embracing the end faces of the rim 23. It is contemplated that this construction may be employed in any of the several forms of the invention disclosed. The synchronizer rings 25 are provided with internal conical clutch faces 32 adapted to engage external faces 30 of clutch cones 33 and 34 respectively formed on the torque transmitting members 10 and 17. The rings 25 may be supported either by the engagement of the collars 26 in the recesses 27 or by the engagement of the clutch faces 33 and 34 through the medium of intervening oil films indicated at 30, such films preventing destructive wear.

In order to effect clutching engagement between a friction clutch face 30 and its cooperating friction face 32, a ring 25 is urged axially by axial thrust transmitted to it from the movable clutch sleeve through the medium of thrust bars 51. A thrust bar 51 is roughly dumbbell-shaped, having a reduced waist region 52 and radially enlarged heads 53 forming between them shoulders 54 which, in the preferred form of the invention, are frusto-conical for a purpose which will hereinafter appear. The heads 53 are received in notches 55 in the synchronizer rings, the sides of the notches 55 forming cam surfaces or ramps adapted, under biasing of a synchronizer ring as shown in Fig. 2, to force the heads 53 radially outwardly, the thrust bars being restrained against circumferential movement by recesses 57 in the hub, in which they are seated. The engagement of the ramps against the heads 53 also serves to transmit drive between the rings and the hub.

When a synchronizer ring has become biased sufficiently to interpose a head 53 in blocking relation to the sleeve 18, movement of the sleeve against the head will transmit thrust to the synchronizer ring, with which the heads are adapted to have abutting, positive thrust transmitting engagement, and the frictional driving engagement thus developed between the friction faces 30 and 32 will be effective to complete and maintain the biasing of the ring against forces which tend to return the ring to a neutral position as will hereinafter be more fully pointed out.

Initial biasing of the ring may be effected in either of two ways. Where the synchronizer ring is arranged to ride upon its coacting cone through the medium of an oil film, there will be a constant transmission of a slight amount of torque to the ring whenever differential rotation exists between the ring and its cone, and thus the heads 53, when not confined within the sleeve 18, will be maintained in blocking position as shown in full lines in Fig. 1.

Where the synchronizer rings are arranged to be normally out of contact with their cooperating cones, as shown in Fig. 9, biasing of a ring may be effected by axial thrust transmitted through the bars 51 during the initial stage of shifting movement. Thrust transmitting engagement with the interior of the sleeve 18 may be established by the bearing of the bars against the sleeve under the effect of centrifugal force. As soon as contact between the ring and the cone is established, the biasing will be completed and maintained in the manner set forth above.

In the forms of the invention shown in Figs. 1 to 4 inclusive, the bars 51 are of sufficient length so that when the sleeve 18 is in its neutral position shown, the heads at both ends of the bars may move to blocking position so as to be immediately effective to initiate the synchronizing action upon movement of the sleeve in either direction.

In the form of the invention shown in Figs. 5 to 8 inclusive, the thrust bars are shorter than the axial dimension of the sleeve, so that one end of each bar is at all times confined within the sleeve. The blocking action above described will take place in this form of the invention whenever the movable clutch element is moved from one positive clutching position to another. When moving to either of the positive clutching positions after a period of being in neutral position, the thrust bars are adapted to function to transmit thrust by ramp energized pure frictional engagement with the interior surfaces of the teeth 22. That is, the heads 53 will develop thrust receiving purely frictional engagement with the surfaces of the teeth 22, under radially outward pressure developed by the camming action of the ramps 56. Increase in axial thrust against the bars 52 from the sleeve 18 will increase the engagement between the friction members 32, 33 and 34, and this in turn will increase the camming action and thus the thrust transmitting engagement between the heads 53 and the teeth 22. In getting into neutral position, in this form of the invention, the action is the same as in shifting from one positive clutching position to another, except for the final stage of advancing to the new positive clutching position. After the blocking action has subsided, the movable clutch element is advanced to the neutral position and there halted.

At the completion of synchronization, the synchronizer ring will be brought to the neutral position shown in Fig. 3 allowing the heads 53 to be forced radially inwardly under the axial pressure of the sleeve 18 exerted against the conical shoulders 54 by the ends of the teeth 22, and the teeth 22 may then ride over the heads 53 into positive clutching engagement with the jaw clutch teeth 20 or 21 as the case may be, as indicated in dotted lines in Fig. 1. This inwardly camming action may be provided for either by the conical flaring of the shoulders 54, the inclining of the ends of the teeth 22, or both.

In the form of the invention shown in Fig. 4, the bars 51a are urged inwardly against the action of centrifugal force by a retractor spring 60 engaged in grooves 61 in the several bars. The spring 60 may be of such strength as to be capable of retracting the bars 51a against centrifugal force when differential rotation of the friction surfaces ceases, but adapted to yield under the combined effect of centrifugal force and the camming effect of the biased ring.

The form of the invention shown in Fig. 9 is substantially the same as the form shown in Fig. 1, with the exception of the arrangement of the friction faces.

I claim:

1. In a synchronizing transmission, a torque transmitting member, a synchronizer element adapted under axial pressure to establish a synchronizing frictional driving connection between said member and a part to be synchronized therewith, an annular positive drive element drivingly connected to said member and shiftable axially for establishing a positive driving connection between said member and said part, and a combined blocker and thrust member axially movable within said positive drive element, said synchronizer element being adapted to have limited oscillatory movement relative to said member and having a camming region adapted during such movement to project said thrust member radially outwardly, said thrust member being adapted, when thus projected, to be interposed between said synchronizer element and an end region of said positive drive element so as to transmit axial thrust from said positive drive element to said synchronizer element at the end of an initial stage of axial movement of said positive drive element, whereby to effect synchronization, and to block further axial advance of said positive drive element until synchronization has been completed.

2. In a synchronizing transmission, a torque transmitting member, a synchronizer element adapted under axial pressure to establish a synchronizing frictional driving connection between said member and a part to be synchronized therewith, an annular positive drive element drivingly connected to said member and shiftable axially for establishing a positive driving connection between said member and said part, and a combined blocker and thrust bar disposed within said positive drive element parallel to the axis of said member, and axially movable, said synchronizer element having an oscillatory lost motion connection with said member, being adapted to be biased to one limit of said connection under torque developed by said frictional driving connection, and being adapted to urge an end region of said bar radially outwardly when thus biased, said end region being adapted, when thus projected, to be interposed between said synchronizer element and an end region of said positive drive element so as to transmit thrust from said positive drive element to said synchronizer element at the end of an initial stage of axial movement of said positive drive element, whereby to effect synchronization, and to block further axial advance of said positive drive element until synchronization has been completed.

3. A synchronizing transmission as defined in claim 1, wherein the blocking portion of said thrust element comprises a radial projection formed with an inclined shoulder positioned for engagement by said end region of the positive drive element and adapted to react to axial pressure from said positive drive element so as to move the bar radially inwardly out of blocking position when the projection of said bar is relieved by the attainment of synchronization.

4. A synchronizing transmission as defined in claim 2, wherein said bar is cylindrical and said end region comprises a radially projecting flange.

5. In a synchronizing transmission, a pair of axially aligned shafts, a hub fixed on one of said shafts, a pair of synchronizer elements each having an oscillatory lost motion connection with said hub, axially movable relative to said hub, and adapted under axial pressure to establish a synchronizing frictional driving connection between said hub and a cooperating friction clutch element carried by the other shaft, a jaw clutch sleeve encircling and drivingly connected to said hub and shiftable axially for establishing a positive driving connection between said shafts, and an axially arranged thrust bar loosely mounted between said hub and sleeve for radial movement, said bar having its respective ends formed with radial projections adapted to be moved radially into positions blocking the path of axial shifting movement of the respective ends of said sleeve, the bar being adapted when in such blocking position to receive thrust from said sleeve and transmit it to a synchronizer element at the end of an initial stage of axial movement of said sleeve, whereby to effect synchronization, and to block further axial movement of said sleeve until synchronization is completed, and said synchronizer elements being formed with cam means adapted, when differential rotation exists between said shafts, to engage and project an adjacent end region of said bar radially outwardly and, when such differential rotation ceases, to allow such end region to be moved radially inwardly.

6. A synchronizing transmission as defined in claim 5, wherein said projections are spaced apart a distance slightly greater than the axial dimension of that region of the sleeve which is engaged by said projections.

7. A synchronizing transmission as defined in claim 1, wherein the thrust element is adapted to react to centrifugal force so as to establish an initial thrust transmitting relationship between said positive drive element and said synchronizer element for insuring initial biasing of the latter.

8. A synchronizing transmission as defined in claim 1, wherein the friction surfaces are arranged so as to constantly transmit a slight amount of torque through the medium of an interposed oil film when the positive drive element is in neutral position, so as to insure initial biasing of the synchronizer element.

9. In a synchronizing transmission, a pair of axially aligned torque-transmitting members, synchronizer and movable jaw clutch elements drivingly associated with one of said members and movable axially into frictional driving and positive clutching engagement, respectively, with friction and jaw clutch elements carried by the other member, so as to establish first a synchronizing and then a positive drive connection between said members, and means for transmitting axial thrust from said movable clutch element to said synchronizer element for effecting said frictional driving engagement, comprising a bar disposed inside said movable clutch element, having a reduced waist region and an enlarged head separated by a shoulder, said synchronizer element being adapted to have limited circumferential movement relative to said one torque-transmitting member and having a camming region adapted during such circumferential movement to cam said head outwardly so as to bring said shoulder into position to be engaged by said movable clutch element during axial movement thereof, whereby to receive axial thrust therefrom.

10. In a synchronizing transmission, a pair of axially aligned torque-transmitting members, synchronizer and movable jaw clutch elements drivingly associated with one of said members and movable axially into frictional driving and positive clutching engagement, respectively, with friction and jaw clutch elements carried by the other member, so as to establish first a synchronizing and then a positive drive connection between said members, and means for transmitting axial thrust from said movable clutch element to said synchronizer element for effecting said frictional driving engagement, comprising a thrust element operatively interposed between said movable clutch element and said synchronizer element, said thrust element having a shouldered region, said synchronizer element being adapted to have limited circumferential movement relative to said one torque-transmitting member and having a camming region adapted, during such circumferential movement, to cam said thrust element radially outwardly so as to bring said shouldered region into position to be engaged by said movable clutch element during axial shifting of the latter.

11. In a synchronizing transmission, a pair of axially aligned torque-transmitting members, synchronizer and movable jaw clutch elements drivingly associated with one of said members and movable axially into frictional driving and positive clutching engagement, respectively, with friction and jaw clutch elements carried by the other member, so as to establish first a synchronizing and then a positive drive connection between said members, and means for transmitting axial thrust from said movable clutch element to said synchronizer element for effecting said frictional driving engagement, comprising a thrust element operatively interposed between said movable clutch element and said synchronizer element, said thrust element having a shouldered region, said synchronizer element being adapted to have limited circumferential movement relative to said one torque-transmitting member and having an axially opening recess receiving an end region of said thrust element, said recess forming a cammed surface adapted during such circumferential movement, to cam said thrust element radially outwardly to a position wherein said shouldered region will be engaged by said movable clutch element during axial movement of the latter so as to receive axial thrust therefrom.

12. In a synchronizing transmission, a pair of axially aligned torque-transmitting members, synchronizer and movable jaw clutch elements drivingly associated with one of said members and movable axially into frictional driving and positive clutching engagement, respectively, with friction and jaw clutch elements carried by the other member, so as to establish first a synchronizing and then a positive drive connection between said members, and means for transmitting axial thrust from said movable clutch element to said synchronizer element for effecting said frictional driving engagement, comprising a dumbbell-shaped thrust bar disposed inside said movable clutch element with its major axis parallel to the axis of said members, said synchronizer element having an axially opening recess receiving and forming therewith a lost motion connection between said synchronizer element and said one torque-transmitting member, said recess providing a camming surface adapted, during movement of said synchronizer element in said lost motion connection, to cam an end of said bar outwardly so as to dispose one of the heads thereof in obstructing relation to said movable clutch element, so as to receive thrust therefrom.

13. In a synchronizing transmission, a pair of axially aligned torque-transmitting members, synchronizer and movable jaw clutch elements drivingly associated with one of said members and movable axially into frictional driving and positive clutching engagement, respectively, with friction and jaw clutch elements carried by the other member, so as to establish first a synchronizing and then a positive drive connection between said members, and means for transmitting axial thrust from said movable clutch element to said synchronizer element for effecting said frictional driving engagement, comprising a thrust element having a shoulder and an end in thrust-transmitting engagement with the synchronizer element, said synchronizer element being adapted to have a limited amount of circumferential movement relative to said one torque-transmitting member and having a cam portion adapted, during such circumferential movement, to move said thrust element radially outwardly so as to bring said shoulder into blocking relation to said movable clutch element at the end of an initial stage of axial movement of said movable jaw clutch element, whereby to effect synchronization, and to block further axial advance of the latter until completion of synchronization.

14. In a synchronizing transmission, a pair of torque transmitting members to be synchronized, a movable jaw clutch element drivingly associated with one of said members and adapted to be moved into positive clutching engagement with a jaw clutch element drivingly associated with the other member, a friction clutch element arranged to have limited oscillatory movement relative to said one member and to receive from said movable jaw clutch element, at the end of an initial stage of movement thereof, axial pressure to establish frictional synchronizing engagement with a friction clutch element drivingly associated with said other member, and blocker means acted upon by said first mentioned friction clutch element adapted, when the latter is biased to one limit of said oscillatory movement, to be radially projected into engagement with said movable jaw clutch element for blocking further axial advance thereof until synchronization has been completed.

15. In a synchronizing transmission, a pair of torque transmitting members to be synchronized, one of said members comprising a hub, a jaw clutch sleeve encircling and splined upon said hub and adapted to be moved axially in positive clutching engagement with a jaw clutch element drivingly associated with said other member, a synchronizer ring axially recessed into said hub and arranged to have limited oscillatory movement relative to said hub and to receive from said sleeve, at the end of an initial stage of movement thereof, axial pressure to establish frictional synchronizing engagement with a friction clutch element drivingly associated with said other member, a blocker element movably mounted in said hub, engageable by said synchronizer ring, and adapted when the latter is biased to one limit of said oscillatory movement, to be projected into engagement with said movable jaw clutch sleeve for blocking further axial advance thereof until synchronization has been completed.

16. In a synchronizing transmission, a pair of torque transmitting members to be synchronized, a jaw clutch element drivingly associated with one of said members and movable axially into positive clutching engagement with a jaw clutch element drivingly associated with the other member, a friction clutch element arranged to have a limited oscillating movement relative to said one member and to receive from said movable jaw clutch element, at the end of an initial stage of movement thereof, axial pressure to establish frictional synchronizing engagement with a friction clutch element drivingly associated with said other member, a blocker element having camming engagement with said first mentioned friction clutch element adapted, when the latter is biased to one limit of said oscillating movement to be projected into engagement with said movable jaw clutch element for blocking further axial advance thereof until synchronization has been completed.

17. In a synchronizing transmission, a pair of torque transmitting members to be synchronized, a jaw clutch element drivingly associated with one of said members and movable axially into positive clutching engagement with a jaw clutch element drivingly associated with the other member, a synchronizer element adapted under axial pressure to establish frictional synchronizing engagement with a friction clutch element drivingly associated with said other member, and a combined blocker and thrust element arranged to transmit thrust from said movable jaw clutch element to said synchronizer element at the end of an initial stage of movement of said movable jaw clutch element and having a part arranged to be interposed in the path of axial movement of said movable clutch element so as to positively block the final stage of axial movement thereof, said synchronizer element being arranged to have limited oscillatory movement relative to said thrust member, to be biased to one limit of such movement by torque received from its coacting friction clutch element when said members are rotating asynchronously, and coacting with said thrust element so as to maintain the latter in its blocking position when thus biased.

18. In a synchronizing transmission, a pair of axially aligned torque-transmitting members to be synchronized, movable jaw clutch and synchronizer elements drivingly associated with one member, said jaw clutch element being movable axially and said synchronizer element being adapted to be urged under axial pressure into positive clutching and frictional driving engagement respectively with jaw and friction clutch elements drivingly associated with the other member, and a thrust element arranged to transmit axial thrust to said synchronizer element and to receive radially outwardly directed thrust therefrom while relative rotation exists between said synchronizer element and its cooperating friction clutch element, and to be thereby urged into engagement with said movable jaw clutch element so as to receive axial thrust therefrom.

PALMER ORR.